US012213928B2

(12) United States Patent
Li et al.

(10) Patent No.: US 12,213,928 B2
(45) Date of Patent: Feb. 4, 2025

(54) ELECTRONIC LIFTING-LOWERING TRANSFER MACHINE

(71) Applicants: SHENZHEN MAIKANGXIN MEDICAL ROBOT CO., LTD, Shenzhen (CN); Qian Li, Shenzhen (CN)

(72) Inventors: Qian Li, Shenzhen (CN); Xuehai Zhang, Shenzhen (CN); Tianqi Zhao, Shenzhen (CN); Yuanchen Li, Shenzhen (CN)

(73) Assignees: Qian Li, Shenzhen (CN); SHENZHEN MAIKANGXIN MEDICAL ROBOT CO., LTD, Shenzhen (CN)

( * ) Notice: Subject to any disclaimer, the term of this patent is extended or adjusted under 35 U.S.C. 154(b) by 317 days.

(21) Appl. No.: 17/945,090

(22) Filed: Sep. 15, 2022

(65) Prior Publication Data

US 2023/0218462 A1 Jul. 13, 2023

(30) Foreign Application Priority Data

Jan. 7, 2022 (CN) ......................... 202220044845.0

(51) Int. Cl.
*A61G 7/10* (2006.01)
*A61G 5/14* (2006.01)

(52) U.S. Cl.
CPC ............. *A61G 7/1019* (2013.01); *A61G 5/14* (2013.01); *A61G 7/1059* (2013.01)

(58) Field of Classification Search
CPC ....... A61G 7/1019; A61G 7/1059; A61G 5/14
See application file for complete search history.

(56) References Cited

U.S. PATENT DOCUMENTS

| | | | | | |
|---|---|---|---|---|---|
| 2,854,673 | A * | 10/1958 | De Witt | A61G 7/1046 | 414/665 |
| 4,993,085 | A * | 2/1991 | Gibbons | A61G 7/1007 | 4/667 |
| 5,373,591 | A * | 12/1994 | Myers | A47K 3/122 | 4/578.1 |
| 5,592,703 | A * | 1/1997 | Jones | A61G 7/1007 | 297/DIG. 10 |
| 5,836,020 | A * | 11/1998 | Morris | A61G 7/1005 | 4/561.1 |
| 6,161,232 | A * | 12/2000 | Von Schroeter | A61G 7/1019 | 5/83.1 |
| 9,827,162 | B1 * | 11/2017 | Vidmar | A47C 7/006 | |

(Continued)

*Primary Examiner* — Erez Gurari

(57) ABSTRACT

A transfer machine includes: a main body assembly, including two lifting rods capable of moving up and down, two seat plates corresponding to the two lifting rods, wherein the seat plates are capable of rotating around the corresponding lifting rods, allowing the seat plates to close with or separate from each other; a lifting assembly, including a base, a connecting rod fixedly connected to the lifting rods and an electronic controlling assembly. The base includes a guiding bar extending vertically, the lifting rods can move along the guiding bar; the electronic controlling assembly includes a pushing rod, fixedly connected to the connecting rod to drive the two lifting rods to move to further drive the main body assembly to move. The connecting rod has a first connection portion and a second connection portion, a foot section is formed between the first connection portion and the second connection portion.

10 Claims, 2 Drawing Sheets

(56) References Cited

U.S. PATENT DOCUMENTS

| | | | | |
|---|---|---|---|---|
| 10,368,699 | B2 * | 8/2019 | Hart | A47K 3/122 |
| 2006/0236449 | A1 * | 10/2006 | Hammer | A61G 7/1003 4/560.1 |
| 2008/0078015 | A1 * | 4/2008 | Jarosinski | A47K 11/04 4/480 |
| 2011/0227379 | A1 * | 9/2011 | Fogleman | A61G 7/1046 254/2 R |
| 2012/0318587 | A1 * | 12/2012 | Alghazi | A61H 3/04 135/66 |
| 2013/0232686 | A1 * | 9/2013 | Schwartz | A61G 5/14 4/667 |
| 2014/0165287 | A1 * | 6/2014 | Jessen | A61G 7/1067 5/86.1 |
| 2014/0208493 | A1 * | 7/2014 | Ahmed | A61G 7/053 4/237 |
| 2015/0060162 | A1 * | 3/2015 | Goffer | A61G 5/124 180/41 |
| 2018/0055705 | A1 * | 3/2018 | Sineath, Jr. | A61G 7/1007 |
| 2019/0350411 | A1 * | 11/2019 | Hart | A61G 5/1002 |
| 2020/0095757 | A1 * | 3/2020 | Schwab | E03D 11/125 |
| 2021/0330524 | A1 * | 10/2021 | Chien | A61G 7/1048 |
| 2022/0313511 | A1 * | 10/2022 | Li | A61G 5/1059 |
| 2022/0323279 | A1 * | 10/2022 | Li | A61G 5/1059 |
| 2023/0056591 | A1 * | 2/2023 | Christian | A47K 17/02 |
| 2023/0240925 | A1 * | 8/2023 | Gomes Da Costa | A61G 7/1074 4/667 |
| 2024/0041679 | A1 * | 2/2024 | Cooksey | A61G 7/1046 |
| 2024/0156659 | A1 * | 5/2024 | Smith | A61G 7/1088 |

* cited by examiner

ELECTRONIC LIFTING-LOWERING TRANSFER MACHINE

TECHNICAL FIELD

The present disclosure relates to the field of medical devices, and in particular to an electronic lifting-lowering transfer machine.

BACKGROUND

A transfer machine as a medical device is applied in the field of elderly care to solve the problem of moving elderly people with limited mobility between wheelchairs and sofas, beds, toilets, seats, etc., for the purpose of interchanging positions between beds, wheelchairs, sofas, bathrooms, etc., as well as for walking, toileting, hanging needles, etc., thereby significantly reducing the work intensity of caregivers.

However, the transfer machine on the market has a single function, and its application is limited to simple mobility, walking, toileting and hanging needles. The problem of how to control the height between a body and a foot pedal of the transfer machine to fit a required preset height needs to be solved.

SUMMARY OF THE DISCLOSURE

The present disclosure aims to provide an electronic lifting-lowering transfer machine to solve the problem that the foot pedal of the transfer machine cannot be adapted to the required height of the main body assembly.

According to a first aspect of the present disclosure, an electronic lifting-lowering transfer machine includes: a main body assembly, comprising two lifting rods capable of moving up and down, two seat plates corresponding to the two lifting rods, wherein each of the two seat plates is capable of rotating around the corresponding one of the two lifting rods, allowing the two seat plates to close with or separate from each other; a lifting assembly, comprising a base, a connecting rod fixedly connected to the two lifting rods and an electronic controlling assembly. The base comprises a guiding bar extending in an up-down direction, each of the two lifting rods is capable of moving up and down along the guiding bar; the electronic controlling assembly comprises a pushing rod, the pushing rod is fixedly connected to the connecting rod to drive the two lifting rods to move up and down to further drive the main body assembly to move up and down. The connecting rod has a first connection portion and a second connection portion, the first connection portion is connected to the two lifting rods, the second connection portion is connected to the pushing rod, a foot section is formed between the first connection portion and the second connection portion.

In some embodiments, each of the two lifting rods is arranged vertically on the base and arranged to sleeve the guiding rod in the up-down direction, and a circumference of the lifting rod is connected to the connecting rod.

In some embodiments, the connecting rod further comprises the first connection portion and the second connection portion, the first connection portion is connected to the two lifting rods, the second connection portion is connected to the pushing rod, a foot section is formed between the first connection portion and the second connection portion.

In some embodiments, a reinforcement structure is arranged between the foot section and the first connection portion; or the reinforcement structure is arranged between the foot section and the second connection portion; or the reinforcement structure is arranged between the foot section and the first connection portion and between the foot section and the second connection portion.

In some embodiments, the reinforcement structure is arranged as a curved bending portion.

In some embodiments, the two seat plates comprise a left seat plate and a right seat plate, a closing position between the left seat plate and the right seat plate defines an alignment hole. The electronic lifting-lowering transfer machine further comprises a snap and an alignment pin, the alignment pin is connected to the snap through the alignment hole to close the left seat plate with the right seat plate.

In some embodiments, the electrical controlling assembly comprises a motor and the pushing rod, and the motor is configured to drive the pushing rod to move up and down.

In some embodiments, the base further comprises a control box, a controlling component configured to control the motor is arranged inside the control box, and the control box is arranged at a front of the base to serve as a pedal box.

In some embodiments, the electronic controlling assembly further comprises a remote control assembly, a sensor adapted to the remote control assembly, and the sensor is configured to receive an electrical signal from the remote control assembly to control the pushing rod to move up and down.

In some embodiments, the electronic controlling assembly further comprises a limitation assembly, the limitation assembly comprises a first limitation switch for limiting a highest position and a second limitation switch for limiting a lowest position. The first limitation switch and the second limitation switch are both arranged inside the lifting rod.

According to the present disclosure, a connecting rod is fixedly connected to a lifting rod, a foot section is arranged between the first connecting portion and the second connecting portion of the connecting rod. In this way, the user may place feet on the foot section when the transfer machine is at any height, preventing instability and discomfort.

BRIEF DESCRIPTION OF THE DRAWINGS

In order to more clearly illustrate the technical solutions of the embodiments of the present disclosure and the related art, the accompanying drawings for describing the embodiments of the present disclosure or the related art will be briefly described in the following. Apparently, the accompanying drawings in the following are only some embodiments of the present disclosure, other drawings can be obtained by any ordinary skilled person in the art based on the structures shown in these drawings without any creative work.

Figure 1:
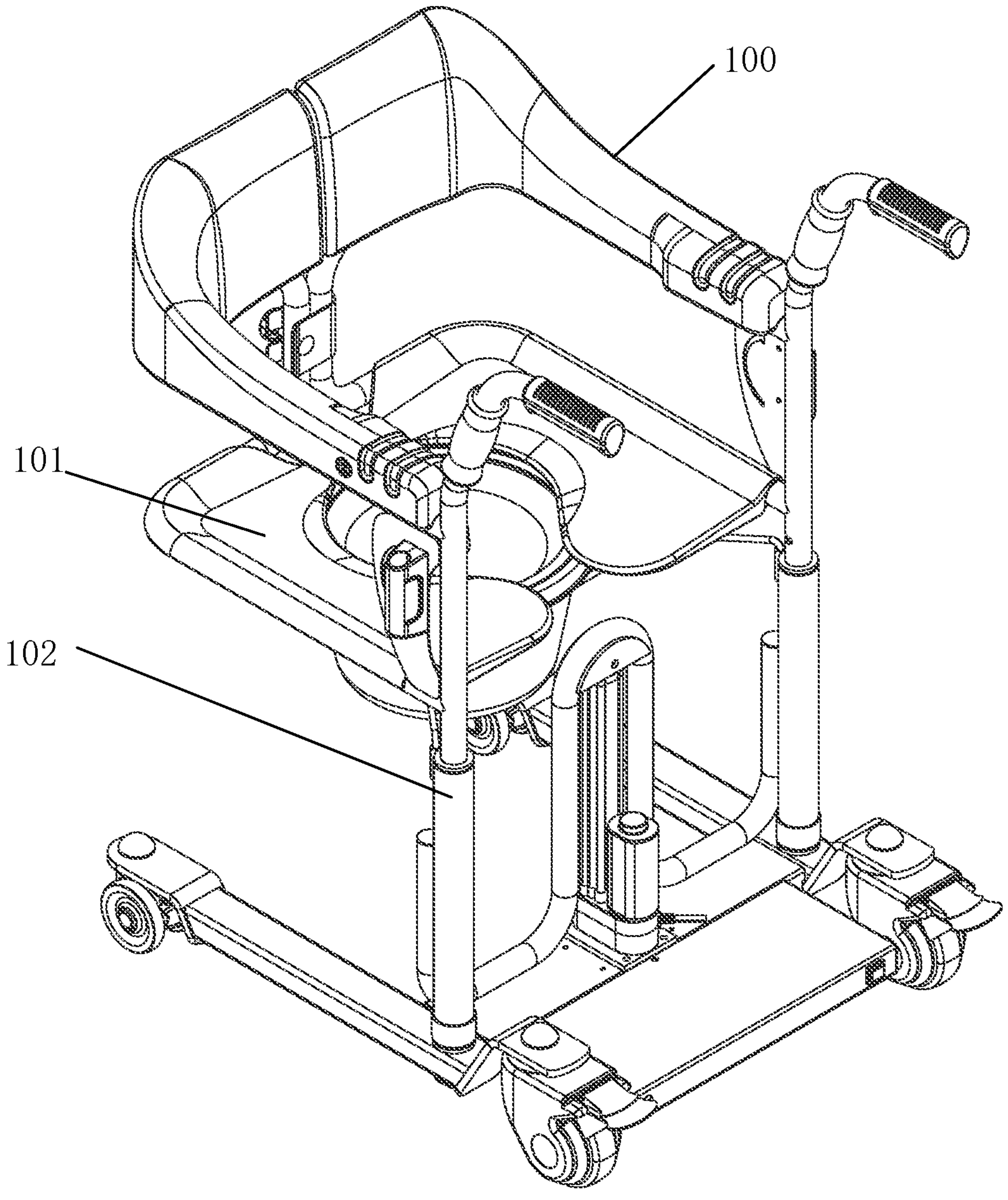
FIG. 1 is a structural schematic view of an entire structure of an embodiment of the present disclosure.

Reference numerals of the present disclosure:

| Reference numerals | element |
|---|---|
| 100 | Main body assembly |
| 101 | Seat plate |
| 102 | Lifting rod |
| 200 | Lifting assembly |

-continued

| Reference numerals | element |
|---|---|
| 201 | Base |
| 202 | Guiding rod |
| 203 | Control box |
| 210 | Electronic controlling assembly |
| 211 | Driving assembly |
| 212 | Transmission assembly |
| 213 | Pushing rod |
| 220 | Connecting rod |
| 221 | First connection portion |
| 222 | Second connection portion |
| 223 | Foot section |
| 224 | Reinforcement structure |
| 300 | Foot pedal |

Achievement, functions and advantages of the present disclosure will be illustrated by referring to the embodiments by referring to the accompanying drawings.

DETAILED DESCRIPTION

The technical solutions of the embodiments will be clearly and completely described below by referring to the accompanying drawings of the present disclosure. Obviously, the described embodiments are only some of but not all of the embodiments of the present disclosure. All other embodiments obtained by any ordinary skilled person in the art based on the embodiments of the present disclosure without creative work shall fall within the scope of the present disclosure.

To be noted that, any directional indication (such as up, down, left, right, forward, back) in the embodiment of the present disclosure are only used to explain relative positions between the components, movement, and so on, when the components are arranged at a particular pose (as shown in the accompanying drawings). When the particular pose is changed, the directional indications shall be changed accordingly.

In addition, when “first”, “second”, and so on, are used for description, the “first”, “second”, and so on, are used only for descriptive purposes only, and shall not be interpreted as indicating or implying relative importance or implicitly specifying the number of technical features indicated. Therefore, features defined by the “first” and the “second” may explicitly or implicitly include at least one such feature. In addition, the technical solutions of various embodiments may be combined with each other, but the combination must be able to be achieved by any ordinary skilled person in the art. When technical features are contradictory and cannot be combined or achieved, such combination shall be deemed as non-existing and shall not be covered by the present disclosure.

Figure 2:
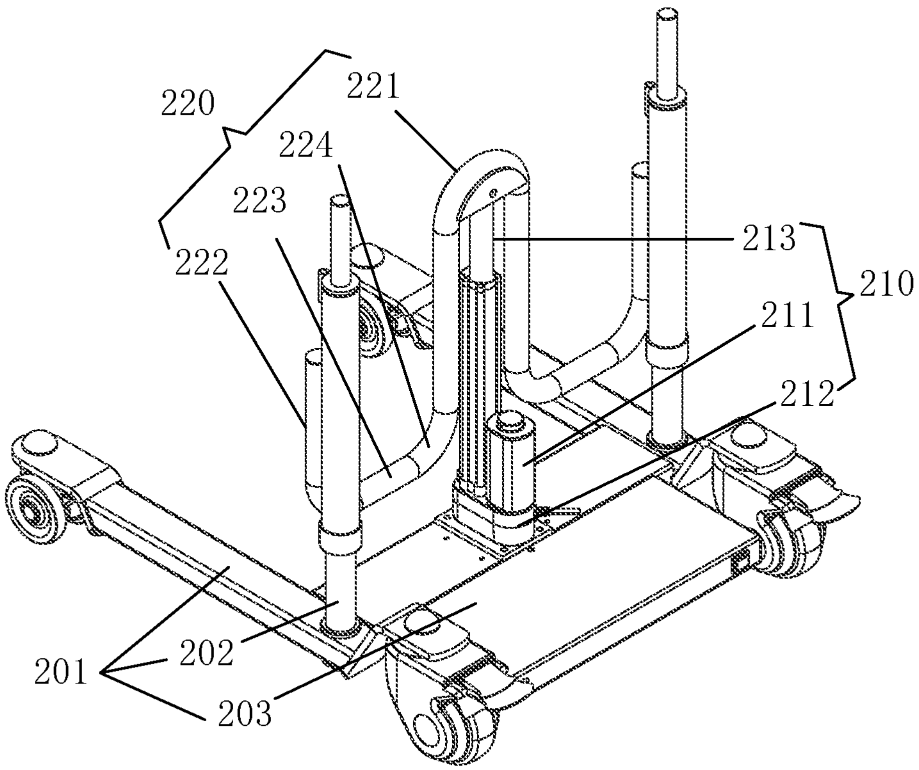
FIG. 2 is a structural schematic view of a partial structure of an embodiment of the present disclosure.
Figure 3:
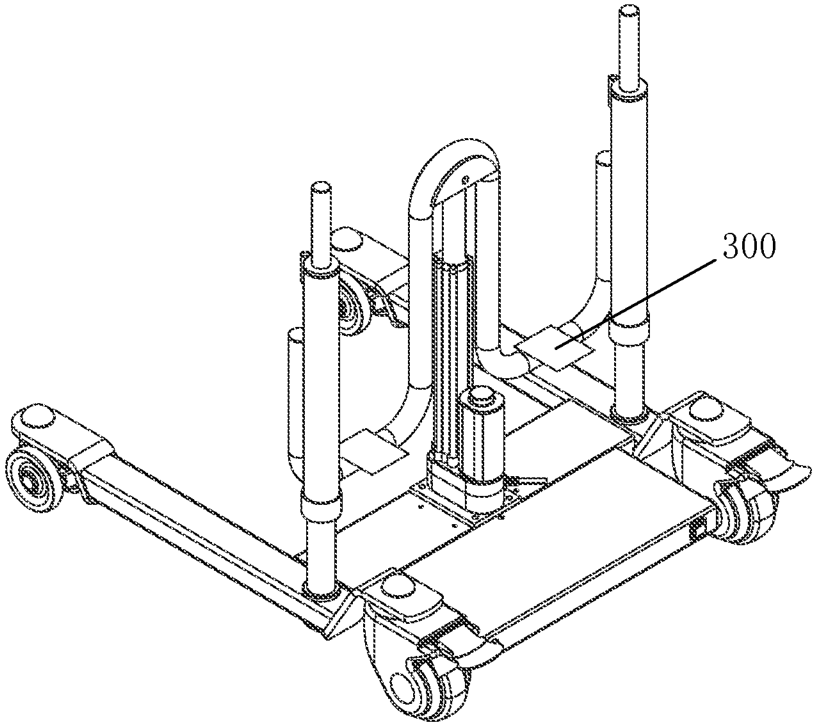
FIG. 3 is a structural schematic view of a partial structure of another embodiment of the present disclosure.

As shown in FIGS. 1 to 3, the present disclosure provides an electronic lifting-lowering transfer machine, applied in the nursing field, facilitating people who have reduced mobility to move between wheelchairs and sofas, beds, toilets, seats, and so on.

The electronic lifting-lowering transfer machine may include following components.

A main body assembly 100 and a lifting assembly 200 are provided. The main body assembly 100 may include two lifting rods 102, which may move upwardly and downwardly, and two seat plates 101 corresponding to the two lifting rods 102. Each of the two seat plates 101 may rotate around the corresponding lifting rod 102, such that the two seat plates 101 may be enclosed with or separated from each other. The lifting assembly 200 may include a base 201, a connecting rod 220 fixedly connected to the lifting rods 102 and an electronic controlling assembly 210.

The base 201 may include a guiding rod 202 extending in an up-down direction. The lifting rods 102 may move upwardly and downwardly along the guiding rod 202. The electronic controlling assembly 210 may include a pushing rod 213, which is fixedly connected to the connecting rod 220 for driving the lifting rods 102 to move upwardly and downwardly, further driving the main body assembly 100 to move upwardly and downwardly. The connecting rod 220 may have a first connecting portion 221 and a second connecting portion 222. The first connecting portion 221 may be connected to the lifting rods 102. The second connecting portion 222 may be connected to the pushing rod 213. A foot section 223 may be formed between the first connecting portion 221 and the second connecting portion 222. The foot section 223 may be configured for the user to place feet. In the present embodiment, the connecting rod 220 may form the foot section 223. A distance between the foot section 223 and the seat plate 101 may be fixed. The foot section 223 may be lifted or lowered as the main body assembly 100 lifts or lowers. According to the present embodiment, no additional components are arranged and structural strength is ensured, and at the same time, when the seat plate 101 is positioned high, the user’s feet may not overhang to occupy spaces for legs, and without overhanging, the feet may not swing to cause any danger to the user.

In detail, the first connecting portion 221 and the second connecting portion 222 are connected to each other through the foot section 223. The first connecting portion 221 may be connected to the lifting rods 102, and the second connecting portion 222 may be connected to the pushing rod 213.

To be noted that, the foot section 223 may be a portion for resting feet. A height difference h may be between the first connecting portion 221 and the second connecting portion 222. When $h=0$, the connecting rod 220 may be arranged horizontally; and when $h\neq 0$, the connecting rod 220 may be arranged unevenly, having a concave part and a convex part.

In some embodiments of the present disclosure, the $h\neq 0$, and the connecting rod 220 has the concave part and the convex part. A middle part of the connecting rod 220 may be configured to connect the pushing rod 213, and may be the second connecting portion 222. The middle part of the connecting rod 220 (the second connecting portion 222) may be the convex part. Two sides of the second connecting portion 222 are recessed downwards to form the foot section 223. An outer side of the foot section 223 may be the first connecting portion 221, and the pushing rod 213 may be arranged within the convex part formed by the second connecting portion 222. The first connecting portion 221 may be configured as a columnar structure, extending upwardly. Alternatively, the first connecting portion 221 may be configured as a connecting part at an end of the foot section 223 for being fixedly connected to the lifting rod 102. In the embodiment shown in FIG. 2 of the present disclosure, the first connecting portion 221 is configured as the columnar structure, extending upwardly.

In the present embodiment, a reinforcement structure 224 may be disposed between the foot section 223 and the first connecting portion 221 and/or between the foot section 223 and the second connecting portion 222.

In detail, the electronic lifting-lowering transfer machine may further include the reinforcement structure 224. The reinforcement structure 224 may be disposed between the first connecting portion 221 and the foot section 223, or between the second connecting portion 222 and a foot pedal 300. Alternatively, the reinforcement structure 224 may be disposed between the first connecting portion 221 and the foot section 223, and between the second connecting portion 222 and the foot section 223.

In some embodiments, the reinforcing structure 224 may be a curved bending portion. The curved bending portion may reduce local stress deformation of the bending portion, compared to a structure having a right-angle bending portion.

It shall be understood that, the connecting rod 220 may be arranged to achieve tow effects. On the one hand, the connecting rod 220 may be configured to connect the pushing rod 213 and the lifting rod 102. On the other hand, the foot section 223 may be formed between the first connecting portion 221 and the second connecting portion 222 for the user to rest feet. In this way, the connecting rod 220 may be any one or combination of a tube, a plate, and a solid rod. For example, each of the first connecting portion 221 and the second connecting portion 222 may be the tube, and the foot section 223 may be the plate.

When the foot section 223 is made of a columnar component, such as a pipe or a bar, the foot section 223 may be arranged with a rectangular foot pedal 300 to increase an area for placing feet, such that the feet the user may be placed more stably.

In the present disclosure, the main body assembly 100 includes two lifting rods 102 and two seat plates 101. Each of the two seat plates may rotate around a corresponding one of the two lifting rods 102, such that the two seat plates 101 may close or separate from each other to form a combination of seat plates 101 that is ergonomically friendly. The seat plates 101 may be configured for carrying weights. The user may sit on the seat plates 101 for a long time comfortably.

The guiding rod 202 extends along the vertical direction of the lifting rod 102, and the lifting rod 102 moves up and down along the guiding rod 202.

It shall be understood that the lifting rods 102 may be arranged into two operating states relative to the base 201.

In a first operating state, the lifting rod 102 only moves up and down along the guiding rod 202. In this case, the seat plate 101 is movably connected to the lifting rod 102, and the seat plate 101 rotates around the lifting rod 102.

In a second operating state, the lifting rod 102 moves up and down along the guiding rod 202 and further rotate around an axis of the lifting rod 102 itself. In this case, the seat plate 101 is fixedly connected to the lifting rod 102, and the seat plate 101 rotates as the lifting rod 102 is rotating around the lifting rod 102 itself.

For the electronic lifting-lowering transfer machine disclosed in the present disclosure, the pushing rod 213, which is arranged with the electronic controlling assembly 210, drives the lifting rod 102 and the connecting rod 220 to be lifted or lowered to further drive the main body assembly 100 to move up and down to reach a desired height. The electronic lifting-lowering transfer machine of the present disclosure may solve the problem of overall inconvenience of nursing care, which is caused by absent of a uniform standard height for sofas, beds, toilets, seats, and so on, leading to difficulties in adapting to corresponding heights. The sling type hydraulic transfer machine on the market may be heavy and may not be easily carried by nursing staff, and the user may not sit on the hydraulic transfer machine on the market for a long time. Compared to the sling type hydraulic transfer machine on the market, the transfer machine of the present disclosure may have a simple structure and may be easily carried. While using the transfer machine of the present disclosure, the user may adjust the height of the transfer machine and move the transfer machine without getting up or moving. When the transfer machine of the present disclosure is not in use, the nursing staff may operate the electronic controlling assembly 210 to reset the transfer machine without applying forces to the seat plate 101.

In the present disclosure, the lifting assembly 200 further includes the connecting rod 220 and the electronic controlling assembly 210 for driving the connecting rod 220 to move up and down. On one hand, the connecting rod 220 is fixedly connected to the lifting rod 102. On the other hand, the connecting rod 220 is connected to the pushing rod 213. When the main body assembly 100 moves upwardly, the electronic controlling assembly 210 drives the pushing rod 213 to move upwardly. The pushing rod 213 drives the connecting rod 220 and the lifting rod 102 to move upwardly, further driving the entire main body assembly 100 to move upwardly, allowing the seat plate 101 to reach a desired height, and vice versa.

In some embodiments, the connecting rod 220 is further arranged with a foot pedal 300 for the user to place feet. Regardless of the height of the main body assembly 100, a distance between the foot pedal 300 and the seat plate 101 is a fixed value. That is, the foot pedal 300 is lifted and lowered simultaneously as the main body assembly 100 is lifted and lowered, such that the user may be always comfortable when being lifted or lowered.

In addition to the above embodiments, the lifting rod 102 is arranged vertically on the base 201. The lifting rod 102 is arranged to sleeve the guiding rod 202 in the up-down direction. A circumference of the lifting rod 102 is connected to the connecting rod 220.

In the present embodiment, the main body assembly 100 moving upwardly and downwardly is defined as the main body assembly 100 being lifted and lowered in a height direction. The lifting rod 102 is arranged vertically and fixedly connected to the base 201. The guiding rod 202 is arranged in the height direction. An axial direction of the lifting rod 102 and an axial direction of the guiding rod 202 are the same. The lifting rod 102 is arranged to sleeve the guiding rod 202. The circumference of the lifting rod 102 is connected to the connecting rod 220. When the pushing rod 213 applies a force to allow the connecting rod 220 (lifting rod 102) and the guiding rod 202 to move relative to each other, the main body assembly 100 gradually moves to reach a desired lifting-lowering amplitude.

In addition to the above embodiment, the seat plate 101 includes a left seat plate and a right seat plate. A closing position between the left seat plate and the right seat plate defines an alignment hole.

The electronic lifting-lowering transfer machine further includes a snap and an alignment pin. The alignment pin is connected to the snap through the alignment hole to close the left seat plate and the right seat plate.

In detail, the seat plate 101 comprises the left seat plate and the right seat plate. Each of the left seat plate and the right seat plate rotates around a corresponding one of the two lifting rods 102. When the two seat plates 101 reach the desired height, the two seat plates 101 may be aligned, and then the user applies a force to the left seat plate and the right seat plate to close the two seat plates. In this way, the two seat plates 101 are connected by the snap, and the alignment pin fixes the snap through the alignment hole, such that the two seat plates 101 are closed with each other.

In addition to the above embodiment, the electronic controlling assembly 210 further includes a driving assembly 211, a transmission assembly 212 and a control assembly. The driving assembly 211 is configured as a motor. The transmission assembly 212 is configured as a gear transmission mechanism. The control assembly includes a control circuit for controlling the motor to be initiated or stopped, and a power supply. A control box 203 is arranged at a front of the base 201, and the control assembly is arranged inside the control box 203.

In the present embodiment, the driving assembly 211 is one of a stepper motor and a servo motor. Lifting and lowering the pushing rod 213 may be achieved by the motor rotating forwardly and reversely. Further, the electronic controlling assembly 210 further includes a remote control assembly, a sensor adapted to the remote control assembly. The sensor is configured to receive an electrical signal from the remote control assembly to control the motor to be initiated or stopped.

To be noted that, the pushing rod 213 can be self-locked. The remote control assembly may control the pushing rod 213 to be stopped at any height, improving responsiveness and stability of the transfer machine.

In the present embodiment, the upper surface of the control box 203 may be flat, serving as the foot pedal 300 for the user to place the feet when sitting still.

Further, the electronic controlling assembly 210 further includes a limitation assembly. The limitation assembly includes a first limitation switch for limiting a highest position and a second limitation switch for limiting a lowest position.

Both the first limitation switch and the second limitation switch are arranged in the lifting rod 102.

In the present embodiment, each of the first limitation switch and the second limitation switch is configured as a travel switch.

To noted that while the main body assembly 100 and the connecting rod 220 are lifting and lowering, two operating states exist.

First Operating State:

When the main body assembly 100 and the connecting rod 220 are lifted and lowered to reach an extreme position (the highest position or the lowest position), the circuit may be automatically controlled to be disconnected without being controlled by the remote control assembly, such that the pushing rod 213 may be protected. It shall be understood that when the main body assembly 100 and the connecting rod 220 reach the highest position or the lowest position, the circuit is automatically disconnected, and the pushing rod 213 stops moving, increasing safety of the transfer machine.

Second Operating State:

When the main body assembly 100 and the connecting rod 220 are lifting and lowering between the highest position and the lowest point, the remote control assembly may control a lifting/lowering amplitude.

The above description shows only preferred embodiments of the present disclosure and does not limit the scope of the present disclosure. Any equivalent structural changes performed under the inventive concept of the present disclosure and based on the specification and the accompanying drawings, applied directly or indirectly in other related technical fields, shall be included in the scope of the present disclosure.

What is claimed is:

1. An electronic lifting-lowering transfer machine, comprising:
   - a main body assembly, comprising two lifting rods capable of moving up and down, two seat plates corresponding to the two lifting rods, wherein each of the two seat plates is capable of rotating around the corresponding one of the two lifting rods, allowing the two seat plates to close with or separate from each other;
   - a lifting assembly, comprising a base, a connecting rod fixedly connected to the two lifting rods and an electronic controlling assembly;
   - wherein, the base comprises a guiding bar extending in an up-down direction, each of the two lifting rods is capable of moving up and down along the guiding bar; the electronic controlling assembly comprises a pushing rod, the pushing rod is fixedly connected to the connecting rod to drive the two lifting rods to move up and down to further drive the main body assembly to move up and down; and
   - the connecting rod has a first connection portion and a second connection portion, the first connection portion is connected to the two lifting rods, the second connection portion is connected to the pushing rod, a foot section is formed between the first connection portion and the second connection portion.

2. The electronic lifting-lowering transfer machine according to claim 1, wherein each of the two lifting rods is arranged vertically on the base and arranged to sleeve the guiding rod in the up-down direction, and a circumference of the lifting rod is connected to the connecting rod.

3. The electronic lifting-lowering transfer machine according to claim 1, wherein the connecting rod further comprises the first connection portion and the second connection portion, the first connection portion is connected to the two lifting rods, the second connection portion is connected to the pushing rod, a foot section is formed between the first connection portion and the second connection portion.

4. The electronic lifting-lowering transfer machine according to claim 3, wherein a reinforcement structure is arranged between the foot section and the first connection portion; or the reinforcement structure is arranged between the foot section and the second connection portion; or the reinforcement structure is arranged between the foot section and the first connection portion and between the foot section and the second connection portion.

5. The electronic lifting-lowering transfer machine according to claim 4, wherein the reinforcement structure is arranged as a curved bending portion.

6. The electronic lifting-lowering transfer machine according to claim 1, wherein the two seat plates comprise a left seat plate and a right seat plate, a closing position between the left seat plate and the right seat plate defines an alignment hole;
   - the electronic lifting-lowering transfer machine further comprises a snap and an alignment pin, the alignment pin is connected to the snap through the alignment hole to close the left seat plate with the right seat plate.

7. The electronic lifting-lowering transfer machine according to claim 1, wherein the electrical controlling assembly comprises a motor and the pushing rod, and the motor is configured to drive the pushing rod to move up and down.

8. The electronic lifting-lowering transfer machine according to claim 7, wherein the base further comprises a control box, a controlling component configured to control the motor is arranged inside the control box, and the control box is arranged at a front of the base to serve as a pedal box.

9. The electronic lifting-lowering transfer machine according to claim 1, wherein the electronic controlling assembly further comprises a remote control assembly, a sensor adapted to the remote control assembly, and the sensor is configured to receive an electrical signal from the remote control assembly to control the pushing rod to move up and down.

10. The electronic lifting-lowering transfer machine according to claim 1, wherein the electronic controlling assembly further comprises a limitation assembly, the limitation assembly comprises a first limitation switch for limiting a highest position and a second limitation switch for limiting a lowest position; and the first limitation switch and the second limitation switch are both arranged inside the lifting rod.

* * * * *